July 2, 1935.     T. P. ANELLO ET AL     2,006,579
LAYER CAKE LAYER
Filed March 16, 1935
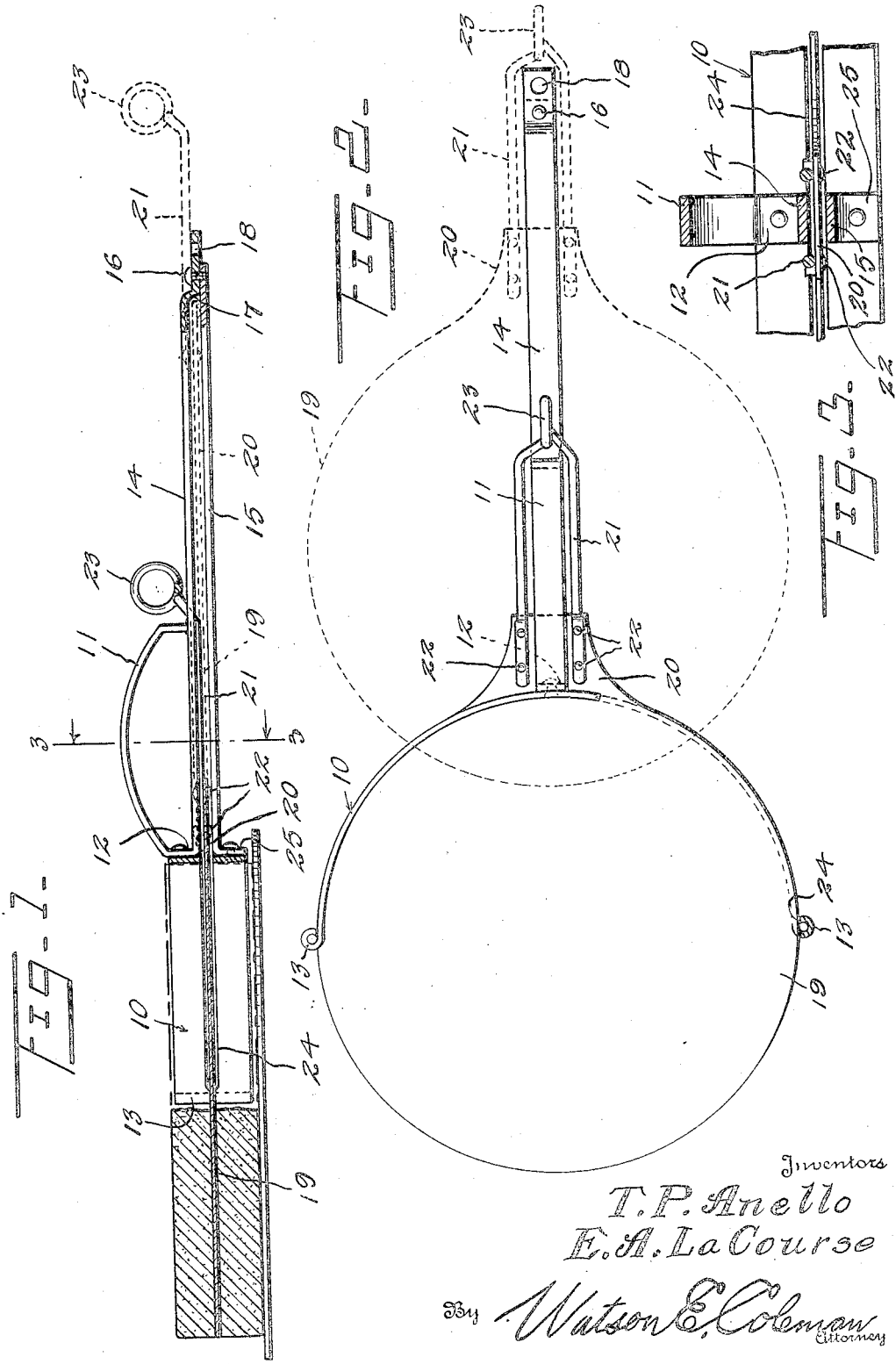
Inventors
T. P. Anello
E. A. LaCourse
By Watson E. Coleman
Attorney Patented July 2, 1935

2,006,579

UNITED STATES PATENT OFFICE 2,006,579

LAYER CAKE LAYER

Tony P. Anello and Eugenie A. La Course,
Ybor City, Fla.

Application March 16, 1935, Serial No. 11,497

6 Claims. (Cl. 107—1)

This invention relates to a means whereby the several layers of a layer cake may be placed one upon the other without breaking the cake as is frequently the case when one layer is being positioned upon the other.

An object of this invention is to provide a means of this kind which is so constructed that it will hold the entire body of the cake and which includes means whereby the supporting means may be pulled out from beneath the cake without breaking the cake during the process of superposing one layer upon the other.

Another object of this invention is to provide a device of this kind which is so constructed that one layer of cake may be superposed upon another layer in concentric relation to the layer underneath.

A further object of this invention is to provide a device of this kind which is exceedingly light in construction so that it may be readily held in one hand with a layer of cake upon the supporting means therefor, and the device operated so as to release the cake from the supporting means for placement upon a preceding layer.

The above and various other objects and advantages of this invention will in part be described and in part be understood from the following detailed description of the present preferred embodiment, the same being illustrated in the accompanying drawing wherein:

Figure 1 is a longitudinal section partly in detail of a device constructed according to an embodiment of this invention, showing the device in operative position;

Figure 2 is a top plan partly broken away and in section of the device;

Figure 3 is a fragmentary sectional view taken on the line 3—3 of Figure 1.

Referring to the drawing wherein like numerals of reference designate corresponding parts throughout the views, the numeral 10 designates generally a fixed plate of arcuate construction which is substantially less than a semi-circle and which is provided at each end with rolled portions 13. This plate 10 is provided at substantially its central portion with a handle 11 of looped construction secured, as at 12, to the outer side of the plate 10 in substantially the center of the plate. The handle 11 is provided with an elongated straight extension 14, and a second straight bar 15 is secured, as at 16, to the outer end of the extension 14. The bar or extension 14 is provided, as at 17, with an offset inner end portion to which the bar 15 is secured. The terminal end of the bar 14 is provided with a hole 18 to be used in hanging the device on a suitable hanger. The bar 15 is disposed in spaced parallel relation to the bar 14. These two bars 14 and 15 constitute a guide means for a cake supporting plate 19. This plate 19 is constructed in flat form and is perfectly round and substantially the same size as the bottom of a layer of cake. The rear or inner portion of the plate 19 is provided with an extension 20 and to this extension 20 are secured a pair of parallel bars 21. The bars 21 are secured as by rivets 22 to one side of the extension 20. The inner or rear ends of the bars 21 are formed in a loop or handle 23 which is angularly disposed with respect to the length of the bars 21.

In the present instance, the plate 10 is provided with a guide slot 24 extending substantially throughout the length of the plate 10 and at a point substantially midway of the width of the plate. The movable cake supporting plate 19 is slidable through this slot 24 when the handle 23 is pulled rearwardly.

In the use of this device, the layer of cake is placed on the cake supporting plate 19 with the plate 19 disposed in its forward position, that is, with an edge of the plate 19 disposed substantially on the concave side of the arcuate plate 10 and with the handle 23 closely adjacent the handle 11. The plate 19 is then disposed immediately above the first layer of cake and then the operating handle 23 is pulled rearwardly so as to draw the plate 19 into the guide formed by the two bars 14 and 15. In this operation, the peripheral portion of the layer of cake will abut against the fixed plate 10 on the upper side of the slot 24, so that when the plate 19 is moved into the guide formed by the two bars 14 and 15, the layer of cake will be held against movement and the supporting plate 19 will be withdrawn from beneath the layer of cake. In this manner, the succeeding layer of cake may be placed upon the preceding layer of cake. At the time the succeeding layer of cake is placed upon the first or preceding layer, the lower portion of the fixed plate 10 will engage the periphery of the first or preceding layer of cake so that the peripheral edges of the two layers of cake will be disposed in alinement.

It will be apparent from the foregoing that an exceedingly simple device has been designed for use as a kitchen utensil whereby any desired number of layers of cake may be disposed one upon the other without cracking the layers of cake as they are being placed one upon the other. The forward end portion of the lower guide bar 15 is provided with an angular extension 25, which engages against the plate 10 on the lower side of the slot 24 so that the forward end of the bar 15 will be held in spaced parallel relation to the bar 14 and the lower side of the handle structure 11. By providing the plate 10 with the slot 24 in substantially the center thereof, this device may be reversed in its operation, that is, either side of the cake supporting plate 19 may be used in the operation of placing one layer upon another. When the cake supporting plate 19 is in inoperative position, the forward end portion thereof will be disposed at substantially the center of the fixed plate 19, as shown in dotted lines in Figure 1 of the drawing.

What is claimed is:—

1. A device as set forth, comprising an abutment plate provided with an elongated slot, a handle secured to the plate, a movable cake supporting plate movable through the slot, and means for supporting said movable plate for movement relative to said first plate.

2. A device as set forth, comprising a fixed plate member having an elongated slot extending lengthwise of the plate, a handle secured to the plate, guide means extending longitudinally of the handle, a movable cake supporting plate movable through said slot, and means secured to the movable plate and slidably engaging the guide means for moving the movable plate relative to the fixed plate.

3. A device as set forth, comprising a fixed arcuate plate provided with a longitudinally extending slot therein, a handle secured to the plate at one side of the slot and in substantially the longitudinal center of the plate, a movable plate slidable through said slot, guide means carried by the handle, and operating means secured to the movable plate and engaging the guide means for moving said movable plate relative to the fixed plate.

4. A device as set forth, comprising an arcuate longitudinally slotted fixed plate, a handle secured at substantially the central portion of the fixed plate on one side of the slot thereof, a movable cake supporting disk, an extension secured to the marginal portion of said disk and extending through said slot, guide means carried by the handle, said extension slidably engaging said guide means, and operating means secured to said extension.

5. A device as set forth, comprising a fixed plate provided with an elongated slot, said plate being of longitudinally arcuate configuration, a handle secured to substantially the longitudinal center of said plate upon one side of the slot, a cake supporting disk adapted to slidably engage in said slot and provided with a marginal extension engaging beneath the handle, a pair of guide bars secured to said handle and said fixed plate and extending longitudinally of the handle, said extension being disposed between said guide bars, and operating means secured to said extension for moving said disk relative to said fixed plate.

6. A device as set forth comprising a fixed elongated plate provided with a longitudinally extending slot in substantially the transverse center thereof, a handle secured to the plate at one side of the slot and in substantially the longitudinal center of the plate, a movable plate slidable through said slot, guide means carried by the handle, and operating means secured to the movable plate and engaging the guide means for moving said movable plate relative to the fixed plate.

TONY P. ANELLO.
EUGENIE A. LA COURSE.